(12) United States Patent
Klinger et al.

(10) Patent No.: US 10,112,589 B2
(45) Date of Patent: Oct. 30, 2018

(54) BRAKE SYSTEM HAVING A BLENDING CAPABILITY

(71) Applicant: AUDI AG, Ingolstadt (DE)

(72) Inventors: Thomas Klinger, Ingolstadt (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/328,750

(22) PCT Filed: Jul. 23, 2015

(86) PCT No.: PCT/EP2015/001511
§ 371 (c)(1),
(2) Date: Jan. 24, 2017

(87) PCT Pub. No.: WO2016/015843
PCT Pub. Date: Feb. 4, 2016

(65) Prior Publication Data
US 2017/0210363 A1   Jul. 27, 2017

(30) Foreign Application Priority Data
Aug. 1, 2014   (DE) .................. 10 2014 011 598

(51) Int. Cl.
*B60T 13/68*   (2006.01)
*B60T 8/26*    (2006.01)
(Continued)

(52) U.S. Cl.
CPC ............... *B60T 8/267* (2013.01); *B60T 1/10* (2013.01); *B60T 8/26* (2013.01); *B60T 11/20* (2013.01);
(Continued)

(58) Field of Classification Search
CPC .......... B60T 13/04; B60T 13/66; B60T 13/74; B60T 13/166; B60T 13/586;
(Continued)

(56) References Cited

U.S. PATENT DOCUMENTS

| 4,093,313 A | 6/1978 | Burckhardt |
| 4,425,005 A * | 1/1984 | Warwick ................. B60T 13/74 188/159 |

(Continued)

FOREIGN PATENT DOCUMENTS

| CN | 101945790 A | 1/2011 |
| DE | 24 26 294 | 11/1975 |

(Continued)

OTHER PUBLICATIONS

International Search Report issued by the European Patent Office in International Application PCT/EP2015/001511.
(Continued)

*Primary Examiner* — Christopher P Schwartz
(74) *Attorney, Agent, or Firm* — Henry M. Feiereisen LLC

(57) ABSTRACT

A brake system for a motor vehicle includes separate first and second brake circuits associated to first and second vehicle axles, respectively, and rigidly connected to each other. Hydraulic brake pressure is supplied by a first brake piston of a master cylinder to the first brake circuit and by a second brake piston to the second brake circuit. Operably connected to the first vehicle axle is an electric motor and operates as a recuperator, with a blending device withdrawing hydraulic fluid from the first brake circuit during a recuperation phase of the electric motor. A partition wall between the first and second brake pistons subdivides the master cylinder into a first pressure chamber associated to the first brake piston, and a separate second pressure asso-
(Continued)

ciated to the second brake piston. A connectable and disconnectable floating piston enables a hydraulic communication between the first and second brake circuits with one another.

5 Claims, 3 Drawing Sheets

(51) Int. Cl.
*B60T 1/10* (2006.01)
*B60T 11/20* (2006.01)
*B60T 13/58* (2006.01)
*B60T 17/22* (2006.01)
*B60T 13/74* (2006.01)

(52) U.S. Cl.
CPC .......... *B60T 13/586* (2013.01); *B60T 13/745* (2013.01); *B60T 13/746* (2013.01); *B60T 17/226* (2013.01); *B60T 2270/604* (2013.01)

(58) Field of Classification Search
CPC ........ B60T 13/686; B60T 13/745; B60T 8/26; B60T 8/267; B60T 8/4022; B60T 8/4086
USPC ........................................ 188/152; 303/114.1
See application file for complete search history.

(56) References Cited

U.S. PATENT DOCUMENTS

| | | | | |
|---|---|---|---|---|
| 5,246,281 A * | 9/1993 | Leppek | ..................... | B60T 1/10 303/114.1 |
| 5,895,100 A | 4/1999 | Ito | | |
| 6,238,017 B1 * | 5/2001 | Eitel | .......................... | B60T 5/00 188/264 D |
| 7,146,812 B2 * | 12/2006 | Nakashima | ............... | B60T 8/38 60/562 |
| 7,309,112 B2 * | 12/2007 | Isono | ..................... | B60K 6/365 303/11 |
| 7,922,264 B2 * | 4/2011 | Baumann | ............... | B60T 8/4081 303/114.1 |
| 8,322,729 B2 | 2/2012 | Michel | | |
| 8,490,983 B2 | 7/2013 | Beringer | | |
| 8,500,133 B2 | 8/2013 | Michel | | |
| 8,517,475 B2 * | 8/2013 | Ishida | ..................... | B60T 8/441 188/359 |
| 8,534,684 B2 | 9/2013 | Michel | | |
| 8,731,780 B2 | 5/2014 | Michel | | |
| 8,857,921 B2 | 10/2014 | Schmid | | |
| 8,894,077 B2 | 11/2014 | Michel | | |
| 9,381,934 B2 | 7/2016 | Koch | | |
| 9,393,911 B2 | 7/2016 | Schmid | | |
| 9,744,862 B2 * | 8/2017 | Arbitmann | ................ | B60T 1/10 |
| 2003/0117012 A1 | 6/2003 | Anwar | | |
| 2008/0258545 A1 * | 10/2008 | Drumm | ................ | B60T 8/3275 303/114.1 |
| 2009/0115244 A1 * | 5/2009 | Schluter | ................ | B60T 8/4077 303/114.1 |
| 2009/0299591 A1 | 12/2009 | Broeckel | | |
| 2010/0125398 A1 | 5/2010 | Headlee | | |
| 2010/0181152 A1 * | 7/2010 | Anderson | ............. | B60T 8/4086 188/152 |
| 2011/0272228 A1 * | 11/2011 | Kunz | ........................ | B60T 1/10 188/358 |
| 2011/0291470 A1 * | 12/2011 | Drumm | ..................... | B60T 1/10 303/3 |
| 2011/0304198 A1 | 12/2011 | Cottrell | | |
| 2012/0049469 A1 | 3/2012 | Michel | | |
| 2012/0098221 A1 | 4/2012 | Michel | | |
| 2012/0126498 A1 | 5/2012 | Michel | | |
| 2012/0132020 A1 | 5/2012 | Schmid | | |
| 2012/0205967 A1 * | 8/2012 | Mahnkopf | ................ | B60T 1/10 303/2 |
| 2012/0242053 A1 | 9/2012 | Michel | | |
| 2012/0256473 A1 | 10/2012 | Schmid | | |
| 2012/0306173 A1 | 12/2012 | Kassira | | |
| 2012/0306174 A1 | 12/2012 | Beringer | | |
| 2013/0043718 A1 * | 2/2013 | Feigel | ..................... | B60T 7/042 303/14 |
| 2013/0169032 A1 * | 7/2013 | Linhoff | ..................... | B60L 7/26 303/3 |
| 2013/0173120 A1 | 7/2013 | Michel | | |
| 2013/0175776 A1 | 7/2013 | Michel | | |
| 2014/0028007 A1 | 1/2014 | Schmid | | |
| 2014/0028083 A1 * | 1/2014 | Gerdes | ..................... | B60T 1/10 303/6.01 |
| 2014/0110996 A1 | 4/2014 | Klinger | | |
| 2014/0265544 A1 * | 9/2014 | Ganzel | ................. | B60T 13/686 303/6.01 |
| 2015/0375772 A1 | 12/2015 | Koch | | |
| 2016/0304072 A1 * | 10/2016 | Knechtges | ............ | B60T 8/4077 |

FOREIGN PATENT DOCUMENTS

| | | |
|---|---|---|
| DE | 26 25 713 | 12/1977 |
| DE | 197 03 061 A1 | 7/1997 |
| DE | 102 21 647 A1 | 7/2003 |
| DE | 10 2005 039 314 A1 | 2/2007 |
| DE | 2010 008 018 A1 | 8/2011 |
| DE | 10 2011 103 540 A1 | 12/2011 |
| DE | 2011 103 541 A1 | 12/2011 |
| DE | 102011085273 * 5/2012 | ............. B60T 13/66 |
| DE | 2011 008 928 A1 | 7/2012 |
| DE | 102011005404 A1 | 9/2012 |
| GB | 1 141 209 A | 1/1969 |
| WO | WO 2010/083925 A1 | 7/2010 |

OTHER PUBLICATIONS

Chinese Search Report dated Jul. 3, 2018 with respect to counterpart Chinese patent application 2015800412841.
English Translation of Chinese Search Report dated Jul. 3, 2018 with respect to counterpart Chinese patent application 2015800412841.

* cited by examiner

BRAKE SYSTEM HAVING A BLENDING CAPABILITY

CROSS-REFERENCES TO RELATED APPLICATIONS

This application is the U.S. National Stage of International Application No. PCT/EP2015/001511, filed Jul. 23, 2015, which designated the United States and has been published as International Publication No. WO 20161015843 and which claims the priority of German Patent Application, Ser. No. 102014011598.4, filed Aug. 1, 20014, pursuant to 35 U.S.C. 119(a)-(d).

BACKGROUND OF THE INVENTION

The invention relates to a brake system for a motor vehicle.

As is it known, hybrid vehicles have the problem that the rear axle, when driven electrically, should recuperate to a maximum during a braking engagement, and that the mechanical brake system—which is connected to the electric motor in parallel—decelerates as little as possible at the same time. The reason is that a greatest possible proportion of the braking energy should be converted into electrical energy. Due to different circumstances, the recuperation power of the electric motor battery assembly is, however, not constant but dependent on various constraints, like e.g. the charge state of the battery, the operating temperature of the electric motor, etc. Therefore, it is desirable that the brake system is blending-capable, i.e. that a flexible split of the brake power between recuperation and hydraulic brake system is rendered possible.

A method and device for recuperation of energy during a braking process of a hybrid vehicle is disclosed in DE 10 2005 039 314 A1. The disclosed blended brake system includes a pressure reduction valve, by which the brake pressure applied by the driver is reduced in dependence on the deceleration proportion of the electric machine.

When in a hybrid vehicle, in which, e.g. the rear axle is electrically driven and which includes a hydraulic brake (=>front/rear split of the brake circuits, i.e. separate brake circuits for front and rear axles which are supplied in tandem construction with hydraulic brake pressure), hydraulic fluid is withdrawn from the brake circuit, associated to the rear axle, to reduce brake power (pressure reduction), the floating piston of the master cylinder compensates this again by overbraking the rear axle as a result of the additional electric braking torque on the rear axle.

WO 2010/083925 A1 discloses an electro-hydraulic brake system for use in vehicles, which can be decelerated by a generator mode of an electric drive motor. The braking system has i.a. a brake booster and an electronic control unit which is provided for distributing the braking action between a generative component or recuperation braking component and a friction brake component. To optimize the pressure medium intake, in particular during recuperation braking operations, it is proposed according to the invention to design the brake booster such that it can be electrically actuated by the electronic control unit.

DE 2625713 A1 discloses a two-circuit system for motor vehicles with a shiftable master cylinder which includes two pressure spaces for the two brake circuits, of which the pressure space for the front axle brake circuit has a larger cross section than the pressure space for the rear axle brake circuit and which are connected with each other by a line extending externally of the master brake cylinder. A shifting valve operating in dependence on the vehicle load is arranged in this line to establish and to interrupt the connection between the two pressure spaces. An intermediate piston, which is arranged between the two pressure spaces in the master cylinder coaxial to the two pressure pistons, is freely movable within a guide sleeve of smaller diameter and is provided with central extensions on both sides thereof for the mechanical cooperation with the two pressure pistons. The two-circuit system is characterized in that the shifting valve is shiftable as a function of the load, of the pressure prevailing in the brake cylinder, and of the deceleration attainable with this pressure.

A generic brake system for a motor vehicle is known from DE 10 2011 008 928 A1.

SUMMARY OF THE INVENTION

The invention is based on the object to improve a brake system for a motor vehicle such that overbraking of an axle of the motor vehicle is prevented.

The sub-claims set forth advantageous refinements of the invention.

The object is achieved by a brake system for a motor vehicle, including a hydraulic brake, having a master cylinder including a first brake piston and a second brake piston, with the first brake piston supplying a first brake circuit associated to a first vehicle axle, and the second brake piston supplying a separate brake circuit, associated to a second vehicle axle, with hydraulic brake pressure. In addition, the brake system includes an electric motor, useable as a recuperator, at the first vehicle axle, and a blending device which —as soon as the electric motor recuperates —withdraws hydraulic fluid from the first braking circuit associated to the first vehicle axle. In addition, a partition wall is formed in the master cylinder between the first and second brake pistons to subdivide the master cylinder into a first pressure chamber associated to the first brake piston and a separate second pressure chamber associated to the second brake piston, with the first and second brake pistons being rigidly interconnected.

In accordance with the invention, the first and second brake circuits are connected to one another via a connectable and disconnectable floating piston in a hydraulically communicating manner.

As a result of the rigid arrangement of the two brake pistons, pressure equalization in the master cylinder cannot take place, when the floating piston is disconnected. This ensures advantageously that there is no change of the hydraulic braking force distribution between the first and second hydraulic brake circuits at the first vehicle axle during recuperation of the electric motor, with the result that overbraking of the first vehicle axle is effectively prevented. This ensures that there is no change of the hydraulic braking force distribution during recuperation of the electric motor, with the result that the motor vehicle reacts the same, regardless as to which proportion of the brake power is assumed by the recuperation. The arrangement of the connectable and disconnectable floating piston has the advantage that with a purely hydraulic braking operation, i.e. a recuperation torque is not available, pressure equalization between the two brake circuits is ensured in correspondence to a known master cylinder in tandem construction.

According to a first embodiment, the blending device is configured as an actuator which is electrically activated via an electric open-loop and closed-loop control unit. A corresponding closed-loop/open-loop control advantageously ensures that the hydraulic brake power at the first vehicle axle is reduced during a recuperation phase of the electric motor in proportional relation to the recuperation torque. A further advantage of the configuration of the blending device as an actuator that can be electrically controlled by open-loop or closed-loop control resides in the possibility of further advantageous settings through a corresponding closed-loop/open-loop control, e.g. synchronization of the hydraulic brake power in the first and second brake circuits, i.e. brake pressure in the first and second brake circuits differs. The overall brake power comprised of brake power of first brake circuit and second brake circuit and recuperation torque is constant.

Preferably, the brake system further includes a detection device which communicates with the open-loop and closed-loop control unit and which determines, during a braking command of a driver, the braking torque—recuperation torque—as provided by the recuperator. In addition, the open-loop and closed-loop control unit activates the electric actuator such as to withdraw hydraulic fluid from the first brake circuit to such an extent that the brake pressure in the first brake circuit is reduced by the brake partial pressure corresponding to the recuperation torque. This configuration has proven especially advantageous since an optimal split between hydraulic braking torque and recuperation torque is now ensured, with the result that the greatest possible proportion of the kinetic energy can be converted into electric energy during a braking operation.

According to another embodiment of the invention, the blending device is configured as a mechanically-operated final control element or actuator, e.g. in the form of a stroke cylinder which automatically withdraws volumes, i.e. hydraulic fluid, in proportional relation to the recuperation torque from the first brake circuit. For example, a ball ramp is arranged directly on the electric motor or transmission thereof and executes a stroke change as a function of the applied torque. As a result, a stroke is generated at the reciprocating piston in proportional relation to the recuperation torque.

In order to synchronize the first and second brake circuits, a proportional valve is preferably arranged between the first and second brake circuits. This proportional valve is normally open so as to establish pressure equalization analogous to a conventional master cylinder in tandem construction, and is closed during recuperation and used for synchronization of the two brake circuits.

Preferably, the brake system includes moreover a brake booster. As a result of the withdrawal of hydraulic fluid from the first brake circuit and the accompanying reduced brake pressure, the pedal force is reduced. The provision of the controllable brake booster advantageously ensures that this effect is compensated, so that the driver of the motor vehicle perceives no change on the pedal.

BRIEF DESCRIPTION OF THE DRAWING

Further advantages, features and possible applications of the present invention will become apparent from the following description in conjunction with the embodiments illustrated in the drawings.

In the drawing, it is shown in.

DETAILED DESCRIPTION OF PREFERRED EMBODIMENTS

Figure 1:
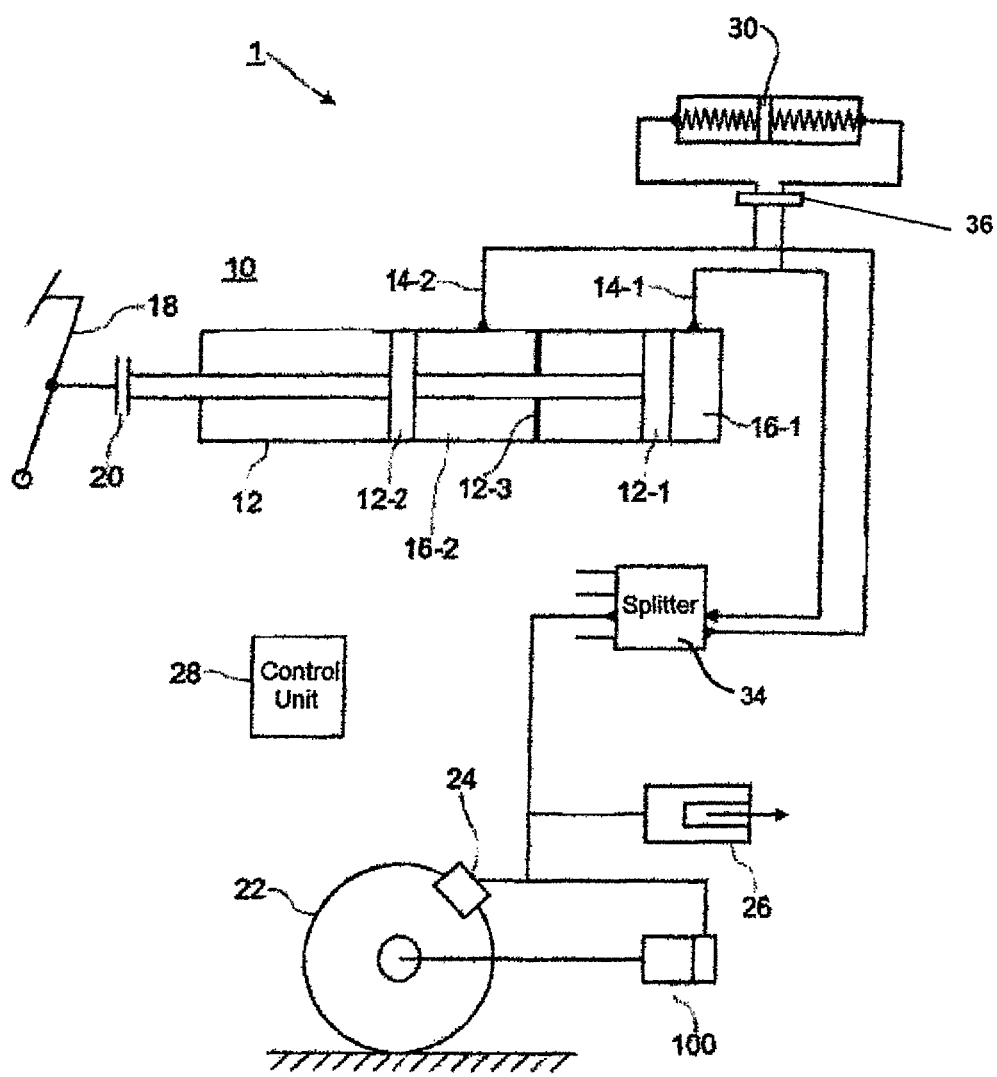
FIG. 1 a schematic illustration of the brake system according to the invention, FIG. 2 another embodiment of the master cylinder of FIGS. 1 and FIG. 3 a block diagram showing the relationship and operation of the components of the brake system.

FIG. 1 shows a brake system, generally designated by reference numeral 1, for a motor vehicle.

The brake system 1 includes a hydraulic brake, generally designated by reference numeral 10, and an electric motor 100 that can be used as recuperator, e.g. on the rear axle of the motor vehicle.

When the driver commands a braking operation, the overall brake power of the brake system 1 is thus comprised of the mechanical brake power of the hydraulic brake 10 and the recuperation torque of the electric motor 100.

The hydraulic brake 10 includes a master cylinder 12 having a first brake piston 12-1 which supplies a first brake circuit 14-1 with hydraulic brake pressure, and a second brake piston 12-2 which supplies a second brake circuit 14-2, separate from the first brake circuit 14-1, with hydraulic brake pressure.

As is further apparent from FIG. 1, a partition wall 12-3 is formed in the master cylinder 12 to subdivide the brake master cylinder 12 into a first pressure chamber 16-1, associated to the first brake piston 12-1, and a second pressure chamber 16-2, separate from the first pressure chamber and associated to the second brake piston 12-2. Moreover, the first brake piston 12-1 and the second brake piston 12-2 are rigidly connected to one another.

Furthermore, a brake pedal 18 is provided for actuation of the master cylinder 12 in a known manner and is operably connected with the rigidly interconnected brake pistons 12-1, 12-2 via an electric brake booster 20.

The master cylinder 12 has a front/rear split, i.e. the first brake circuit 14-1 supplies the brake calipers, associated to the wheels of the rear axle, with hydraulic brake pressure, and the second brake circuit 14-2 supplies the brake calipers, associated to the wheels of the front axle, with hydraulic brake pressure.

For sake of clarity, FIG. 1 shows only one wheel 22 of the rear axle and a brake caliper 24 arranged therein.

As is further apparent from FIG. 1, a blending device 26 is associated to the first brake circuit 14-1 to withdraw hydraulic fluid from the first brake circuit 14-1 during a recuperation phase of the electric motor 100.

The blending device is configured here in the form of an actuator 26 which is electrically activated by an open-loop/closed-loop control unit 28.

Figure 3:
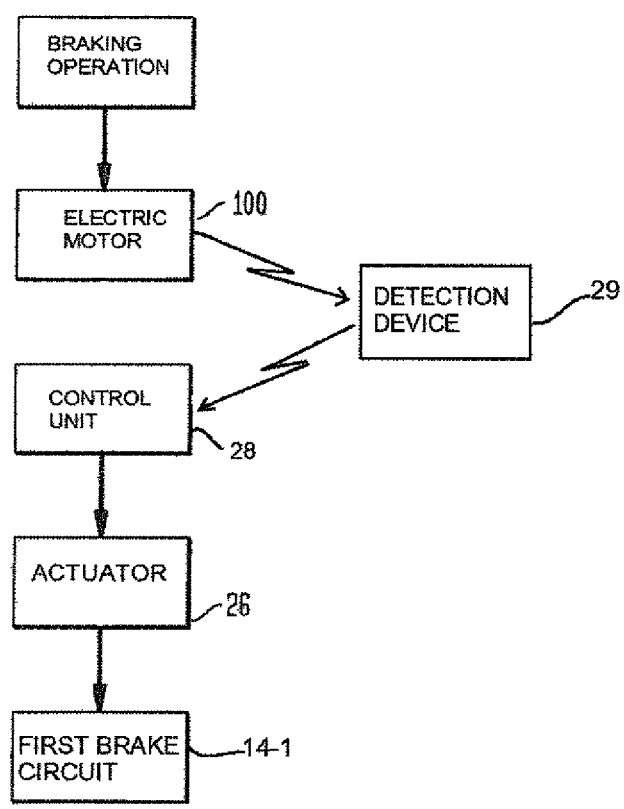

As is also shown by the block diagram of FIG. 3, the open-loop/closed-loop control unit 28 communicates with a detection device 29 which determines, during a brake command by the driver, a recuperation torque provided by the electric motor 100. In addition, the open-loop/closed-loop control unit 28 activates the actuator 26 so as to withdraw hydraulic fluid from the first brake circuit 14-1 to such an extent that the brake pressure in the first brake circuit 14-1 is reduced by the brake partial pressure corresponding to the recuperation torque.

As a result of the configuration of the master cylinder 12 with the partition wall 12-3 and the rigid arrangement of the two brake pistons 12-1 and 12-3, it is now ensured that in the presence of a brake command by the driver and deceleration of the rear axle via the hydraulic brake 10 and the recuperation torque of electric motor 100, there is no pressure equalization in the master cylinder 12, so that overbraking of the rear axle is effectively prevented.

The reduced brake pressure in the second brake circuit 14-2 causes a reduced pedal force. The brake booster 20 with adjustable brake boost compensates this effect again, so that the driver does not perceive any change at the pedal.

As is further apparent from FIG. 1, the two brake circuits 14-1, 14-2 are operably connected with one another via a valve 36 to thereby connect and disconnect a floating piston 30 in a hydraulically communicating manner. The connectable and disconnectable floating piston 30 advantageously ensures that in a purely hydraulic braking operation, i.e. a recuperation torque is not available, pressure equalization between the two brake circuits 14-1 and 14-2 is ensured in correspondence with a known master cylinder in tandem construction.

Figure 2:
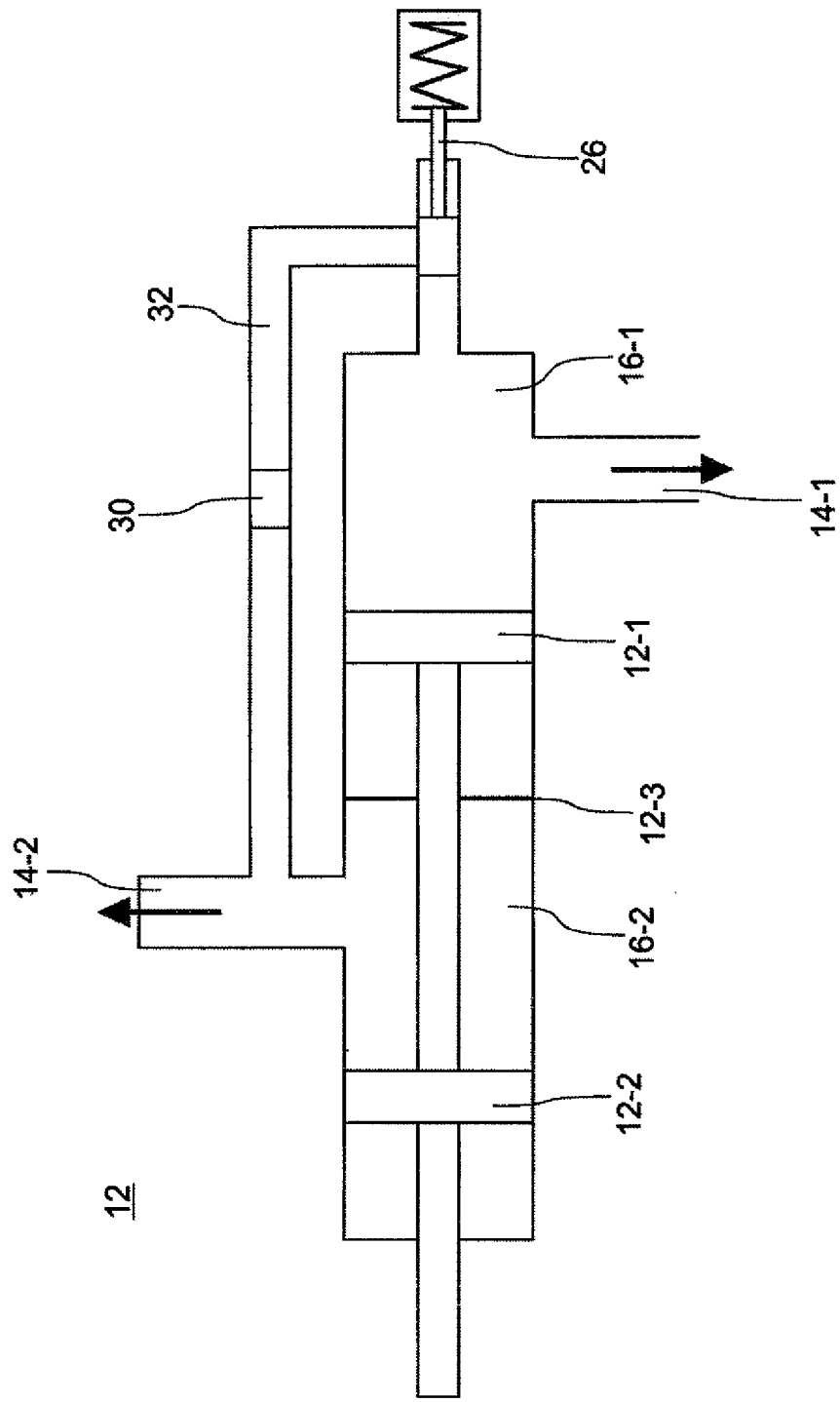

FIG. 2 shows a further embodiment of the master cylinder 12 of FIG. 1. The floating piston 30 is hereby integrated in a connection line 32 which establishes a hydraulic communication of the first pressure chamber 16-1 and the second pressure chamber 16-2 with one another. This ensures a particularly compact design in an advantageous manner.

What is claimed is:

1. A brake system for a motor vehicle, said brake system comprising:
   a first brake circuit associated to a first vehicle axle;
   a second brake circuit associated to a second vehicle axle and separate from the first brake circuit;
   a hydraulic brake including a master cylinder, said master cylinder comprising a first brake piston supplying the first brake circuit with hydraulic brake pressure, and a second brake piston supplying the second brake circuit with hydraulic brake pressure, said first and second brake pistons being rigidly connected to each other;
   an electric motor operably connected to the first vehicle axle and configured to operate as a recuperator;
   a blending device configured to withdraw hydraulic fluid from the first brake circuit during a recuperation phase of the electric motor;
   a partition wall formed in the master cylinder between the first and second brake pistons to subdivide the master cylinder into a first pressure chamber which is associated to the first brake piston, and a second pressure chamber which is separate from the first pressure chamber and associated to the second brake piston; and
   a floating piston operably connected to the first and second brake circuits by way of a valve to disable or enable a hydraulic communication between the first and second brake circuits with one another depending on whether a pressure difference exists between the first pressure chamber and the second pressure chamber.

2. The brake system of claim 1, wherein the blending device is configured as an actuator, and further comprising an electric control unit configured to electrically activate the actuator.

3. The brake system of claim 2, further comprising a detection device configured to communicate with the control unit and to determine a recuperation torque provided by the recuperator, when a driver initiates a braking operation, said control unit activating the actuator such as to withdraw hydraulic fluid from the first brake circuit sufficient to reduce the brake pressure in the first brake circuit by a braking partial pressure corresponding to the recuperation torque.

4. The brake system of claim 2, wherein the actuator is a mechanically-operated actuator.

5. The brake system of claim 1, further comprising a brake booster configured to actively influence a brake pedal force.

* * * * *